United States Patent [19]

Takada et al.

[11] Patent Number: 4,708,361
[45] Date of Patent: Nov. 24, 1987

[54] SUSPENSION FOR OFF-ROAD MOTOR VEHICLES

[75] Inventors: Minoru Takada, Tokyo; Toshio Tsuchiya, Saitama, both of Japan

[73] Assignee: Honda Giken Kogyo Kabushiki Kaisha, Tokyo, Japan

[21] Appl. No.: 833,810

[22] Filed: Feb. 26, 1986

[30] Foreign Application Priority Data

Feb. 26, 1985 [JP] Japan ................................. 60-36802

[51] Int. Cl.⁴ ............................................. B60G 3/20
[52] U.S. Cl. .................................... 280/663; 280/691
[58] Field of Search ............... 280/663, 666, 725, 796, 280/664, 695, 700, 788; 267/20 R, 20 A, 691, 660

[56] References Cited

U.S. PATENT DOCUMENTS 2,814,503 11/1957 Porsche et al. ...................... 280/664
3,037,762 6/1962 Axtmann .............................. 280/664
3,786,889 1/1974 Kelley ................................. 280/663

FOREIGN PATENT DOCUMENTS 56-890 7/1982 Japan .

Primary Examiner—David M. Mitchell
Assistant Examiner—Karin L. Ferriter
Attorney, Agent, or Firm—Irving M. Weiner; Joseph P. Carrier; Pamela S. Burt

[57] ABSTRACT

A suspension in an off-road motor vehicle, includes a vehicle frame, a front wheel, and a trailing arm suspension mechanism by which the front wheel is suspended from the vehicle frame. The trailing arm suspension mechanism comprises two parallel arms having front ends pivotally mounted on a front portion of the vehicle frame and rear ends on which the front wheel is steerably supported, and a joint member connected between the front ends of the arms and including a portion coupled to the vehicle frame.

3 Claims, 4 Drawing Figures

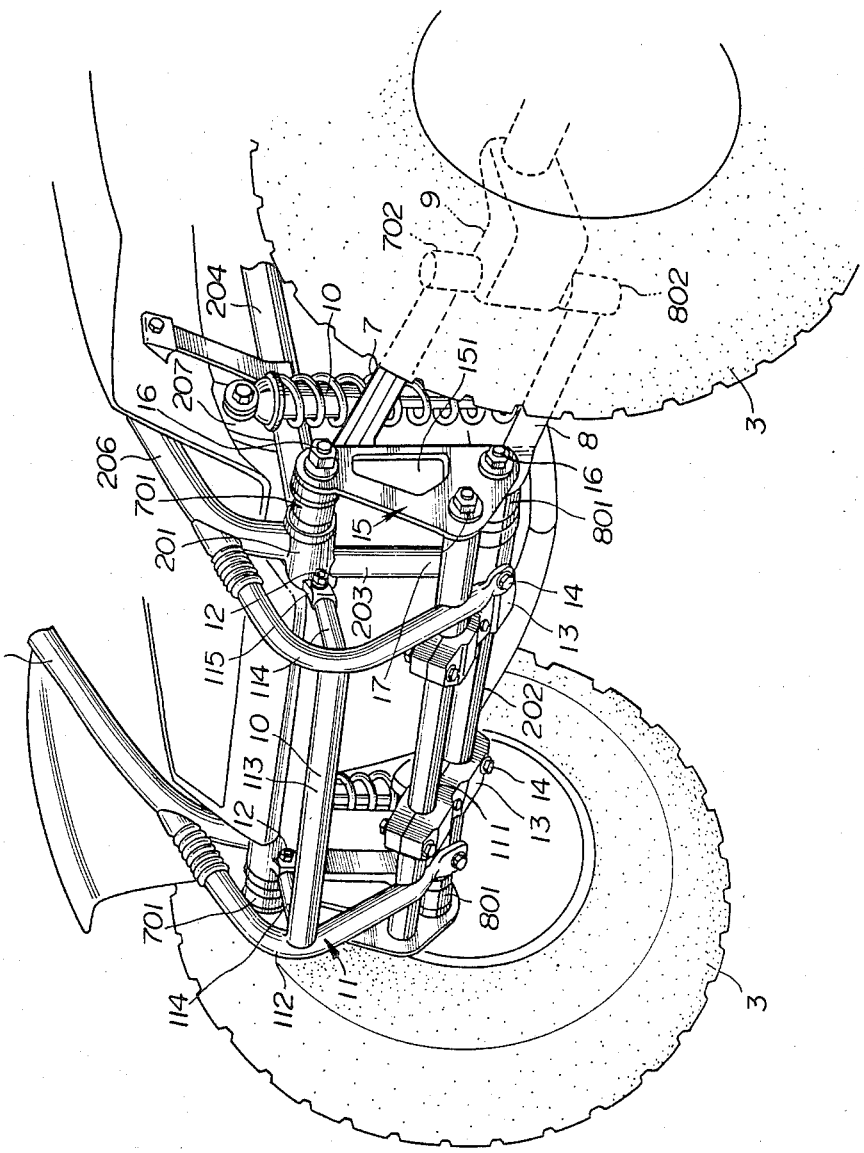

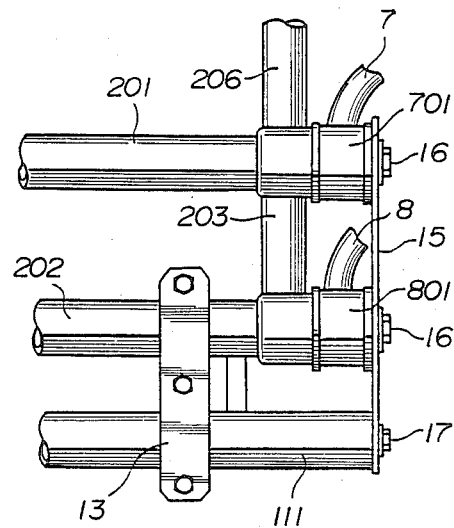
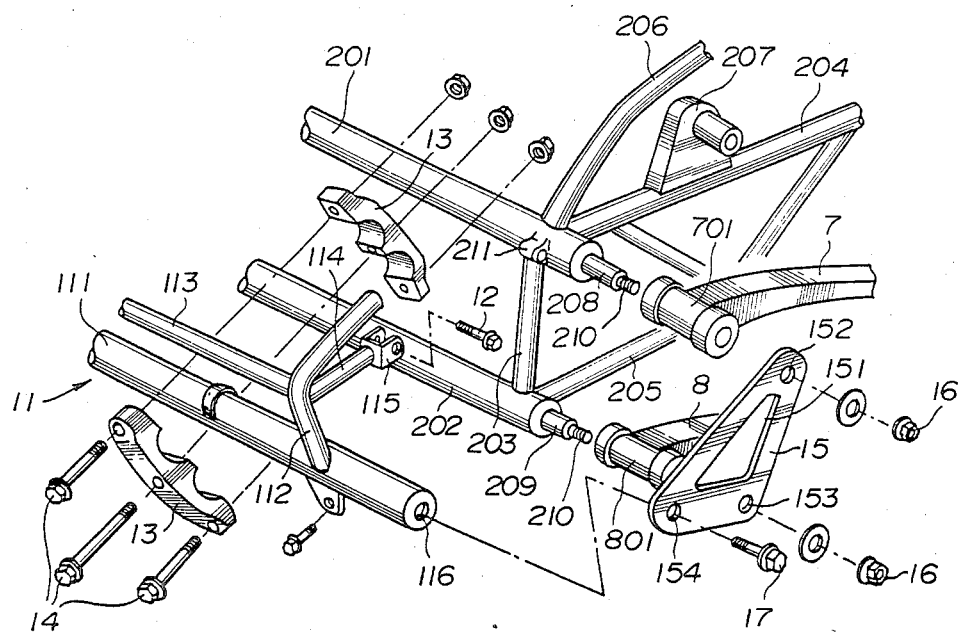

SUSPENSION FOR OFF-ROAD MOTOR VEHICLES

BACKGROUND OF THE INVENTION

1. Field of the Invention

The present invention relates to a suspension for use in an off-road motor vehicle.

2. Discussion of Relevant Art

Off-road motor vehicles known as four-wheeled buggies are currently in use. Japanese Utility Model Application No. 50(1975)-22548 (Japanese Utility Model Publication No. 57(1982)-56890) discloses a suspension for use in such off-road motor vehicles. The disclosed suspension comprises a trailing-arm suspension including a single swing arm for supporting a front wheel, the swing arm having a front end pivotally mounted on a vehicle frame with a damper connected between the swing arm and the vehicle frame.

It has been desired that the front wheel suspension for use in off-road motor vehicles be increased in mechanical strength and rigidity since the off-road motor vehicles are supposed to travel over mountainous areas and rough terrain. The mechanial strength and rigidity of the front wheel suspension can be increased by constructing the swing arm as an arm assembly comprising two parallel links or arms. When an off-road vehicle with such a front wheel suspension jumps and then falls into contact with ground, the shocks can effectively be absorbed by vertical swinging movement of the parallel links if both front wheels are simultaneously brought into contact with the ground. If, however, one of the front wheels happens to touch ground earlier than the other front wheel, which is often the situation, the arm assembly supporting said one front wheel is subjected to a bending moment, which tends to be imposed on the corresponding one of the two parallel links, undesirably causing stresses to be concentrated in said one link.

SUMMARY OF THE INVENTION

It is an object of the present invention to provide a trailing arm suspension for use in off-road motor vehicles which comprises an arm assembly including two parallel links or arms for supporting a wheel and is designed to distribute loads from the wheel to the links and transmit the loads to a vehicle frame for dampening shocks encountered when the motor vehicle hits ground, and which is rugged, mechanically strong, rigid, and simple in construction.

According to the present invention, there is provided a susspension in an off-road motor vehicle, comprising a vehicle frame, a front wheel, and a trailing arm suspension mechanism by which the front wheel is suspended from the vehicle frame, the trailing arm suspension mechanism comprising two parallel arms having front ends pivotally mounted on a front portion of the vehicle frame and rear ends on which the front wheel is steerably supported, and a joint member connected between the front ends of the arms and including a portion coupled to the vehicle frame.

The above and further objects, details and advantages of the present invention will become apparent from the following detailed description of a preferred embodiment thereof, when taken in conjunction with the accompanying drawings.

BRIEF DESCRIPTION OF THE DRAWINGS

FIG. 1 is a perspective view of a suspension according to the present invention;

FIG. 2 is a fragmentary front elevational view of the suspension shown in FIG. 1;

FIG. 3 is a fragmentary exploded perspective view of the suspension of FIG. 1.

DETAILED DESCRIPTION OF THE PREFERRED EMBODIMENT

Figure 4:
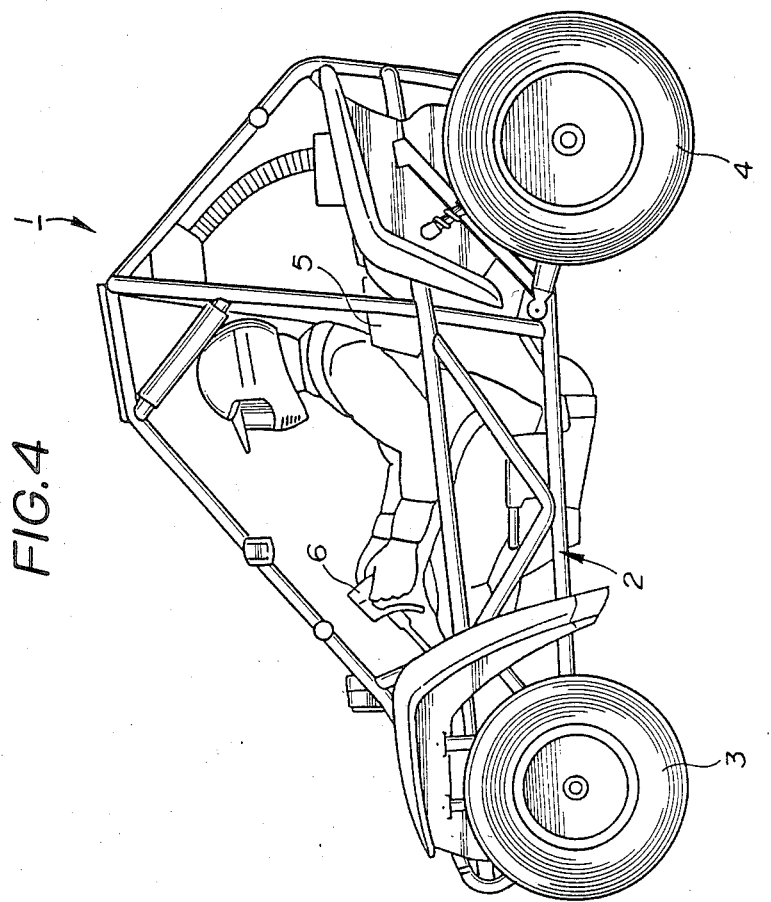
FIG. 4 is a side elevational view of an off-road motor vehicle in which the suspension of the invention is incorporated.

FIG. 4 illustrates an off-road motor vehicle 1 known as a four-wheeled buggy, having two front wheels 3 and two rear wheels 4 which are rotatably supported on front and rear end portions, respectively, of a vehicle frame 2 on lateral sides thereof. A driver's seat 5 is supported on the vehicle frame 2 between the front and rear wheels 3, 4, and a steering wheel or handle 6 is also supported on the vehicle frame 2 in front of the driver's seat 5 and operatively coupled to the front wheels 3.

FIGS. 1 and 3 show the front end portion of the vehicle frame 2. The front end portion of the vehicle frame 2 includes two parallel, vertically spaced front cross members 201, 202 extending transversely of the vehicle frame 2, and two vertical members 203 interconnecting the front cross members 201, 202 at their lateral ends. Upper and lower frame members 204, 205 extend rearwardly from the ends of the front cross members 201, 202. A guard member 206 also extends rearwardly and upwardly from each of the ends of the upper front cross member 201. A damper bracket 207 is attached to the upper surface of a front portion of each of the upper frame members 204.

The ends of the front cross members 201, 202 have shafts 208, 209, respectively, projecting laterally outwardly, the shafts having externally threaded portions 210, 210, respectively. Two vertically spaced swing arms or links 7, 8, which jointly constitute a trailing arm suspension mechanism, have tubular bosses 701, 801, respectively, on their front ends, the tubular bosses 701, 801 being fitted respectively over the shafts 208, 209. As illustrated in FIG. 1, the arms 7, 8 have respective rear ends 702, 802 between which a knuckle 9 is angularly movably coupled. Each of the front wheels 3 is supported by one of the knuckles 9. Thus, the front wheel 3 is supported on by the vehicle frame by the upper and lower parallel arms or links 7, 8.

A front bumper 11 is attached to the front end of the vehicle frame as shown in FIG. 1. The front bumper 11 comprises a larger-diameter cross member 111, a pair of substantially L-shaped stays 112 joined to the cross member 111 near the ends thereof, a subcross member 113 extending between the stays 112 and positioned upwardly of the cross member 111, and a pair of support stays 114 extending rearwardly from intermediate portions, respectively, of the stays 112. Each of the support stays 114 has a bifurcated attachment 115 on its rear end, the bifurcated attachment 115 being fastened by a bolt 12 to a bracket 211 projecting forwardly from one of the ends of the front cross member 201.

The cross member 111 and the lower cross member 202 are securely interconnected by two separable clamps 13, 13 each assembled by bolts and nuts 14. The clamps 13, 13 bridge and are positioned near the axial ends of the cross member 111 and the lower cross member 202.

The cross member 111 of the bumper 11 has threaded holes 116 defined in its opposite axial ends. A joint plate 15 of a substantially triangular shape has a central opening 151 and attachment holes 152, 153, 154 defined respectively in the three corners thereof. The upper and lower attachment holes 152, 153 are fitted respectively over the external threaded portions 210, 210 of the shafts 208, 209 which project out of the bosses 701, 801. Nuts 16, 16 are threaded over the threaded portions 210, 210 which project out of the attachment holes 152, 153, and tightened to couple the upper and lower ends of the joint plate 15 to the arms 7, 8. The remaining attachment hole 154 is aligned with the threaded hole 116 in the end of the cross member 111 of the bumper 11, and a bolt 17 is threaded through the attachment hole 154 into the threaded hole 116 to fasten the joint plate 15 to the cross member 111. Therefore, the joint plate 15 is connected at one position to the vehicle frame and at two positions to the front ends of the arms 7, 8.

A damper 10 has an upper end connected to the bracket 207 and a lower end to the lower arm 8, and serves as part of the suspension.

With the arrangement of the present invention, since the front ends of the upper and lower arms 7, 8 are interconnected by the joint plate 15 and connected thereby to the vehicle frame, a bending moment applied to one of the arms 7, 8 under a side force, produced for example when one of the front wheels 3 is brought into contact with ground, is transmitted to the vehicle frame and the other arm through the joint plate 15. Therefore, the applied moment or load is distributed, and stresses are prevented from being concentrated in one of the arms 7, 8. As a result, the arms 7, 8 are effectively improved in mechanical strength and rigidity, and the durability and reliability of the arms are greatly improved. Inasmuch as the joint plate 15 is of a triangular shape with its corners coupled to the arms 7, 8 and the vehicle frame, the resulting connecting structure is analogous to a truss structure and can sufficiently withstand applied loads. The joint plate 15 thus fastened to the arms 7, 8 and the vehicle frame may be of a small thickness, and is lightweight because of the central opening 151 defined therein. Since the joint plate 15 is connected to the bumper 11, no support means for the joint plate 15 is required to be disposed on the vehicle frame. Accordingly, the suspension of the present invention is simple in construction. Also, as shown in FIGS. 1 and 4, the joint plates 15, 15, on respective sides of the frame 2, are situated within an outer contour of the front wheels 3, 3 when viewed in side elevation.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A suspension for an off-road motor vehicle, comprising:
    a vehicle frame including upper and lower front cross members extending transversely, each cross member having extensions from opposite ends thereof, and a front bumper;
    front wheels;
    a trailing arm suspension for suspending said front wheels from said vehicle frame;
    said trailing arm suspension mechanism including two pairs of upper and lower swing arms, each arm having, on the front end thereof, a tubular boss member directly pivotally fitted over a corresponding one of said extensions of said front cross members of the vehicle frame and a rear end on which a corresponding one of said front wheels is steerably supported;
    a pair of joint members, each having attachment holes into which end portions of said extensions outwardly projecting out of said boss members are fitted for connection between said front ends of a corresponding pair of said arms; and
    said front bumper being connected to said front cross members and having an additional cross member extending between said pair of joint members.

2. A suspension according to claim 1 wherein:
    said joint members are of a substantially triangular shape, each joint member being connected to said front ends of the corresponding pair of arms and one end of said additional cross member of the front bumper respectively.

3. A suspension according to claim 2, wherein:
    said joint members are situated within the outer contour of said front wheels when viewed in side elevation.

* * * * *

UNITED STATES PATENT AND TRADEMARK OFFICE
CERTIFICATE OF CORRECTION

PATENT NO. : 4,708,361

DATED : November 24, 1987

INVENTOR(S) : Takada et al.

It is certified that error appears in the above-identified patent and that said Letters Patent is hereby corrected as shown below:

Column 1, line 53, change "susspension" to --suspension--.
Column 2, line 50, after "supported on" delete "by".

Signed and Sealed this

Seventeenth Day of May, 1988

Attest:

DONALD J. QUIGG

*Attesting Officer*

*Commissioner of Patents and Trademarks*